J. F. DUBY.
GAGE FOR VEHICLE WHEELS.
APPLICATION FILED APR. 3, 1919.
1,324,388.
Patented Dec. 9, 1919.
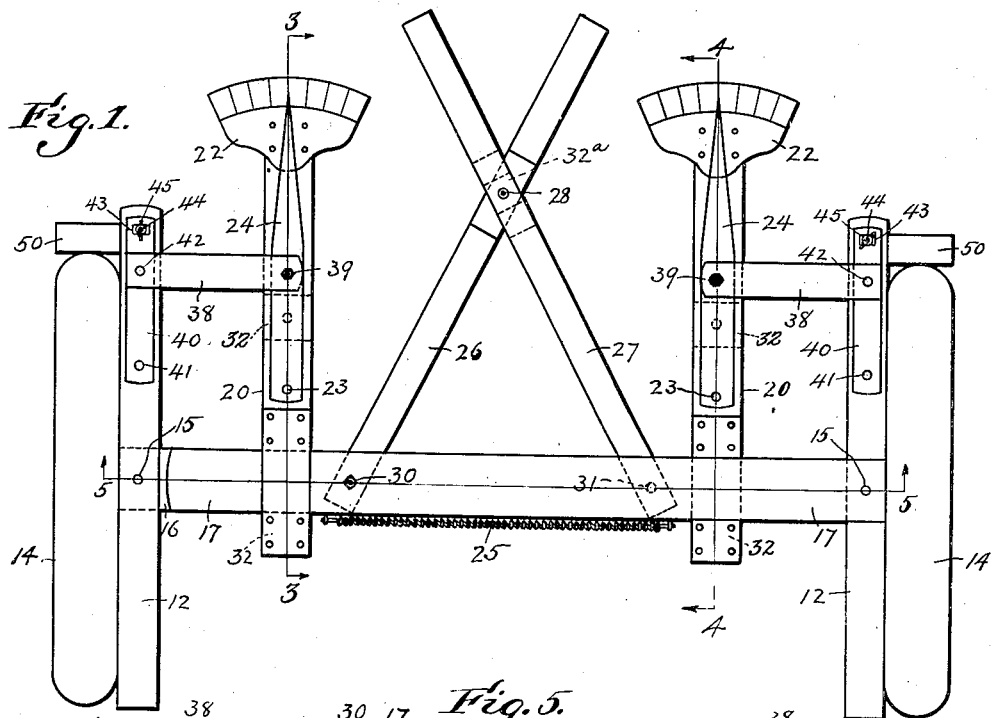
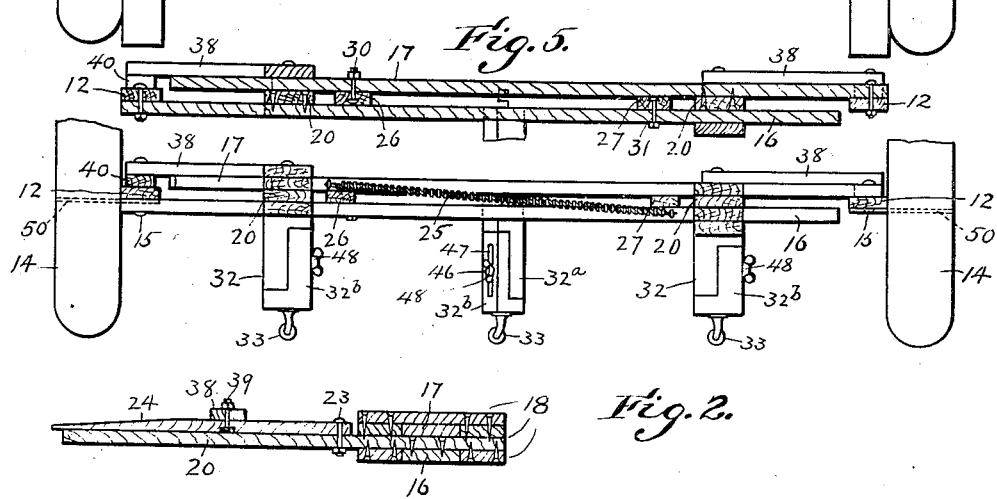
Inventor:
J. F. Duby

UNITED STATES PATENT OFFICE.

JOHN F. DUBY, OF BOSTON, MASSACHUSETTS.

GAGE FOR VEHICLE-WHEELS.

1,324,388.   Specification of Letters Patent.   Patented Dec. 9, 1919.

Application filed April 3, 1919. Serial No. 287,311.

*To all whom it may concern:*

Be it known that I, JOHN F. DUBY, a citizen of the United States, residing at Boston, in the county of Suffolk and State of Massachusetts, have invented new and useful Improvements in Gages for Vehicle-Wheels, of which the following is a specification.

This invention relates to a gage or instrument whereby the wheels of vehicles may be trued up and brought into alinement or parallelism, the object, when rubber tired wheels are used, being to prevent objectionable wear of the tires due to misalinement or deviation from the proper plane of rotation.

The invention has for its object to provide an improved gage capable of being used in connection with either front or rear wheels, irrespective of the size of the wheels and their tires, and of indicating in plain sight of the operator the condition of the wheels as to alinement.

To these and other related ends the invention consists in the improvements which I will now proceed to described and claim.

Of the accompanying drawings, forming a part of this specification,—

Figure 1 is a plan view of a gage embodying the invention.

Fig. 2 is an edge view of the same.

Fig. 3 is a section on line 3—3 of Fig. 1.

Fig. 4 is a section on line 4—4 of Fig. 1.

Fig. 5 is a section on line 5—5 of Fig. 1.

The same reference characters indicate the same parts in all of the figures.

In the drawings, 12, 12, represent two straight-edged bars or gage-heads, adapted to bear on the inner sides of the two wheels 14, which may be either the steering or the rear wheels of a motor vehicle. The portions of the wheels with which the said heads contact are preferably the tires, the gage-heads being horizontally supported between the axle and the floor by the means presently described, and being of such length that they contact with the tires at opposite sides of the wheel centers.

The gage heads 12 are pivoted at 15 to bars 16 and 17, forming members of an elongated two-part holder for said heads, which holder is variable in length, said bars being parallel with each other and adapted to slide lengthwise as required to adapt the gage heads to the distance between the wheels 14. Any suitable means may be provided for guiding the bars 16 and 17 in parallel paths and preventing each bar from moving relatively to the other, excepting in a longitudinal direction. Fig. 3 shows a group of strips or blocks fixed to each other and to the bar 16, and collectively forming a guide or socket indicated as a whole by 18, in which the bar 17 is slidable. Fig. 4 shows a similar group of strips or blocks fixed to the bar 17, and collectively forming a guide 19 for the bar 16. It is obvious that a guide or socket of any suitable construction may be fixed to each bar to guide the other bar longitudinally.

To each of the holder bars 16 and 17, is attached a scale-and-pointer-carrying arm 20. These arms project horizontally from said bars and at right angles therewith, each arm being provided at its outer end with a graduated segmental scale plate 22. To each arm is pivoted at 23 a pointer 24, the pointers coöperating with the graduated scales.

The two-part holder formed by the bars 16 and 17, may be normally elongated by a spring 25 attached at one end to the bar 16, and at its opposite end to the bar 17, said spring being adapted to press the gage heads yieldingly against the inner sides of the wheels 14. Said holder may be manually contracted by two levers 26 and 27 crossing each other and pivoted together at 28, and pivoted at their inner ends at 30 and 31 to the holder bars 16 and 17. The outer ends of the levers 26 and 27 constitute handles which may be grasped by the operator and moved in the directions required to reduce the length of the holder and the distance between the gage heads 12. The gage is supported by legs having wheels or casters 33, adapted to run on a floor. There may be five legs, viz., four legs 32, two attached to each of the arms 20, and a fifth leg 32ª, secured to the pivot bolt 28 which connects the levers 26 and 27. The relative positions of the legs are indicated by dotted lines in Fig. 1. The leg 32ª may be omitted.

The handle ends of the levers 26 and 27 are extended outwardly from the pivot 28, far enough to enable the operator to conveniently grasp the same when the two-part holder is under an axle and the gage heads 12 are in operative relation to the wheels 14.

The operator, by grasping the handle ends of the levers 26 and 27, and moving the same toward each other, reduces the length of the two-part holder and the distance between the gage heads 12, and then pushes the gage to place under the axle. When the said handle ends are released the spring 25 acts to elongate the two-part holder and press the gage heads against the wheels.

The gage heads 12 are connected with the pointers 24 by links 38, which are pivoted at 39 to the pointers and are preferably connected adjustably with the gage heads by short bars 40 pivoted at 41 to the gage heads, and at 42 to the links 38, said bars being provided with slots 43 receiving bolts 44 fixed to the heads 12, and provided with wing-nuts 45 whereby the bars 40 may be adjustably clamped to the gage heads. The object of this adjustable connection is to enable the pointers to be adjusted to compensate for wear, or misalinement. The outer ends of the gage heads 12 are provided with stops 50 arranged to abut against the treads of the wheels 14, and limit the inward movement of the gage under the axle.

If the wheels are in proper alinement and in parallel planes, this fact is indicated by the registration of the pointers 24 with the central or zero marks of the scale plates when the gage heads are applied to the wheels. Any deviation of either wheel from its proper position is indicated by a movement of the corresponding pointer relatively to the accompanying scale plate.

The legs 32 are preferably adjustable in length to vary the height of the gage above the floor. To this end each leg may include a fixed main portion 32, and an adjustable portion 32ᵇ carrying the caster, and secured to the main portion by a bolt 46 passing through a slot 47 in the adjustable portion, and provided with a clamping-wing-nut 48.

The gage may be used in connection with the rear wheels, as well as the front wheels, irrespective of the size of the wheels and their tires, and its construction is such that the scale plates and pointers project in plain view of the operator, which is a marked advantage, particularly when the gage is applied to rear wheels.

After the gage has performed its function it may be left in position while the mechanic is lining up the wheels, if need for this operation is indicated by the gage.

The provision of means for adjusting the pointers to compensate for wear is a marked advantage.

It will be seen by reference to Figs. 1 and 2, that the holder is formed to be horizontally supported under a vehicle axle, with the gage heads bearing on the inner sides of the wheels, and above the floor or base on which the wheels rest, and that the arms 20 are elongated, so that the scale plates, carried by their outer ends, are adapted to project from one end of a vehicle under which the holder may be located, the pointers 24 projecting to a corresponding extent, so that the registering means may be conveniently read by an operator standing outside the end of the vehicle. The levers 26 and 27 are similarly elongated, so that the operator standing as above stated, may conveniently manipulate the levers.

I claim:

1. A gage of the character stated, comprising a holder of variable length, formed to be placed under a vehicle axle between the wheels on said axle, gage heads pivoted to opposite ends of the holder and adapted to be variably spaced apart thereby, arms rigidly attached to and projecting laterally from the holder, and similarly adapted to be variably spaced apart thereby, means for horizontally supporting the holder, gage heads, and arms above the base on which the wheels rest, the arms being elongated so that their outer ends are adapted to project from one end of a vehicle under which the holder may be located, and registering means including graduated scales attached to the outer ends of the arms, and pointers connected with the gage heads, so as to be moved over the scales by the pivotal movement of the heads, said pointers projecting over the scales, the said registering means being exposed for convenient reading by an operator at one end of the vehicle.

2. A gage of the character stated, comprising a holder of variable length, formed to be placed under a vehicle axle between the wheels on said axle, gage heads pivoted to opposite ends of the holder and adapted to be variably spaced apart thereby, arms rigidly attached to and projecting laterally from the holder, and similarly adapted to be variably spaced apart thereby, means for horizontally supporting the holder, gage heads, and arms above the base on which the wheels rest, the arms being elongated so that their outer ends are adapted to project from one end of a vehicle under which the holder may be located, registering means including graduated scales attached to the outer ends of the arms, and pointers connected with the gage heads, so as to be moved over the scales by the pivotal movement of the heads, said pointers projecting over the scales, the said registering means being exposed for convenient reading by an operator at one end of the vehicle, and manually operable means for manipulating and varying the length of the holder, said means being extended from the holder and adapted to project from one end of a vehicle under which the holder may be located.

3. A gage of the character stated, comprising a holder of variable length, formed to be interposed between two vehicle wheels below the axle thereof, and composed of oppositely movable bars, each slidably engaged with the other to vary the length of the holder, a pair of arms projecting laterally from the holder, each arm being attached to one of the holder bars, so that the arms may be variably spaced apart by said holder, gage heads pivoted to the outer ends of said bars and adapted to be variably spaced apart thereby, means for horizontally supporting the holder, gage heads, and arms, above the base on which the wheels rest, the arms being elongated so that their outer ends are adapted to project from one end of a vehicle under which the holder may be located, registering means including graduated scales attached to the outer ends of the arms, and pointers connected with the gage heads, so as to be moved over the scales by the pivotal movement of the heads, said pointers projecting over the scales, and a pair of crossed levers pivoted together and pivoted to the holder bars, and provided with operating handles which are extended from the holder and adapted to project from one end of a vehicle under which the holder may be located.

4. A gage of the character stated, comprising a holder of variable length, formed to be interposed between two vehicle wheels below the axle thereof, and composed of oppositely movable bars, each slidably engaged with the other to vary the length of the holder, a pair of arms projecting laterally from the holder, each arm being attached to one of the holder bars, so that the arms may be movably spaced apart by said holder, gage heads pivoted to the outer ends of said bars and adapted to be variably spaced apart thereby, means for horizontally supporting the holder, gage heads, and arms, above the base on which the wheels rest, the arms being elongated so that their outer ends are adapted to project from one end of a vehicle under which the holder may be located, registering means including graduated scales attached to the outer ends of the arms, and pointers connected with the gage heads, so as to be moved over the scales by the pivotal movement of the heads, said pointers projecting over the scales, and a spring connected with the holder bars respectively, and normally elongating the holder to its maximum length.

5. A gage of the character stated, comprising a holder of variable length, formed to be interposed between two vehicle wheels below the axle thereof, and composed of oppositely movable bars, each slidably engaged with the other to vary the length of the holder, a pair of arms projecting laterally from the holder, each arm being attached to one of the holder bars, so that the arms may be variably spaced apart by said holder, gage heads pivoted to the outer ends of said bars and adapted to be variably spaced apart thereby, means for horizontally supporting the holder, gage heads, and arms, above the base on which the wheels rest, the arms being elongated so that their outer ends are adapted to project from one end of a vehicle under which the holder may be located, registering means including graduated scales attached to the outer ends of the arms, and pointers connected with the gage heads, so as to be moved over the scales by the pivotal movement of the heads, said pointers projecting over the scales, a spring connected with the holder bars respectively, and normally elongating the holder to its maximum length, and manually operable means for manipulating the holder and decreasing its length against the force of said spring.

6. A gage of the character stated, comprising a pair of gage heads adapted to bear on the inner sides of a pair of wheels, a longitudinally extensible holder pivoted at its opposite ends to said heads, and composed of oppositely movable bars, each slidably engaged with the other to vary the length of the holder and the distance between the heads, a pair of arms projecting laterally from said holder, each arm being rigidly attached to one of the holder bars, so that the arms may be variably spaced apart by said holder, said arms being provided with graduated scales, pointers pivoted to said arms, links connecting said pointers with the gage heads so that the pointers will be moved over the scales by the pivotal movement of the heads, and manually operable holder-adjusting means projecting laterally from the holder, whereby the length of the holder may be varied.

7. A gage of the character stated, comprising a pair of gage heads adapted to bear on the inner sides of a pair of wheels, a longitudinally extensible holder pivoted at its opposite ends to said heads, said holder being composed of oppositely movable bars, each slidably engaged with the other to vary the length of the holder and the distance between the heads, a pair of arms projecting laterally from said holder, each arm being rigidly attached to one of the holder bars, the arms and the gage heads being adapted to be variably spaced apart by said holder, said arms being provided with graduated scales, pointers pivoted to said arms, links connecting said pointers with the gage heads so that the pointers will be moved over the scales by the pivotal movement of the heads, and bars adjustably secured to said gage heads, and pivotally connected with said links, means being provided for securing said bars to the gage heads in different positions.

In testimony whereof I have affixed my signature.

JOHN F. DUBY.